(12) United States Patent
Arasachetty et al.

(10) Patent No.: US 9,400,793 B2
(45) Date of Patent: *Jul. 26, 2016

(54) MODEL FOR GENERATING CUSTOM FILE PLANS TOWARDS MANAGEMENT OF CONTENT AS RECORDS

(71) Applicant: Oracle International Corporation, Redwood Shores, CA (US)

(72) Inventors: Bhageerath Arasachetty, Mysore (IN); Shyam Babu Prasad, Bangalore (IN); Hari Charan Ramachandra Rao, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/700,162

(22) Filed: Apr. 30, 2015

(65) Prior Publication Data

US 2015/0234836 A1 Aug. 20, 2015

Related U.S. Application Data

(63) Continuation of application No. 13/492,932, filed on Jun. 11, 2012, now Pat. No. 9,047,294.

(51) Int. Cl.
*G06F 17/30* (2006.01)

(52) U.S. Cl.
CPC .... *G06F 17/30082* (2013.01); *G06F 17/30693* (2013.01)

(58) Field of Classification Search
CPC ............ G06F 17/30082; G06F 17/30011; G06F 17/30085; G06F 17/30864; G06F 17/3053; G06F 17/30693
See application file for complete search history.

(56) References Cited

U.S. PATENT DOCUMENTS

| 7,124,272 | B1* | 10/2006 | Kennedy ............... G06F 3/0613 711/173 |
| 7,233,959 | B2 | 6/2007 | Kanellos et al. |
| 7,451,155 | B2* | 11/2008 | Slackman ............. G06Q 10/10 |
| 7,788,222 | B2 | 8/2010 | Shah et al. |
| 8,209,337 | B2* | 6/2012 | Park .................. G06F 17/30722 707/688 |
| 8,464,206 | B2* | 6/2013 | Jenkins ................ G06F 9/4443 717/101 |
| 2003/0182304 | A1* | 9/2003 | Summerlin ......... G06F 17/2785 |
| 2003/0236788 | A1* | 12/2003 | Kanellos ........... G06F 17/30286 |
| 2007/0288247 | A1* | 12/2007 | Mackay ................. G06Q 10/00 705/1.1 |
| 2008/0086463 | A1* | 4/2008 | DeBie ............... G06F 17/30707 |
| 2008/0154970 | A1* | 6/2008 | DeBie ............... G06F 17/30174 |

(Continued)

OTHER PUBLICATIONS

"Utilizing Compound Term Processing to Address Records Management Challenges" www.conceptsearching.com , Published on 2002, pp. 1-8.

(Continued)

*Primary Examiner* — Leslie Wong
(74) *Attorney, Agent, or Firm* — IPHORIZONS PLLC; Narendra Reddy Thappeta

(57) ABSTRACT

Convenient approach for managing records with respect to entities based on file plans. In an embodiment, historical data representing policies previously selected is maintained. The historical data is then used to generate custom file plans containing policies most likely to be used by a corresponding user. A list in such custom file plan may have more relevant policies prioritized higher. A user may thus conveniently select a desired policy, and associate the selected policy with a set of entities to cause the selected policies to be applied against management of the set of entities.

14 Claims, 6 Drawing Sheets

(56) References Cited

U.S. PATENT DOCUMENTS

| | | | |
|---|---|---|---|
| 2008/0155652 A1* | 6/2008 | DeBie | G06F 21/604 726/2 |
| 2008/0295101 A1* | 11/2008 | Vicars | G06F 17/30011 718/102 |
| 2008/0320011 A1 | 12/2008 | Crockett et al. | |
| 2009/0049509 A1* | 2/2009 | Chan | G06F 21/604 726/1 |
| 2010/0299431 A1* | 11/2010 | Vanderhook | G06Q 30/0204 709/224 |
| 2011/0010348 A1* | 1/2011 | Vu | G06F 17/30705 707/694 |
| 2011/0131251 A1* | 6/2011 | Abnous | G06F 17/30607 707/802 |
| 2011/0153579 A1* | 6/2011 | Paknad | G06F 17/30569 707/694 |
| 2011/0218995 A1 | 9/2011 | Ayars et al. | |
| 2012/0311662 A1* | 12/2012 | Abnous | G06F 17/30607 726/1 |

OTHER PUBLICATIONS

"Electronics Record Management System" http://www.moreq2.eu/other-specifications/files-download/122_9b74f5b0659ff69fe06713c7032339c6 Downloaded circa Dec. 1, 2011, pp. 1-94.

"Specifying File Plan Relationship Definitions", http://publib.boulder.ibm.com/infocenter/irm/v8r5m0/index.jsp?topic=/com.ibm.administeringirm.doc/toc28063605.htm, Downloaded circa Nov. 30, 2011, pp. 1-2.

"Content Type and Workflow Planning", http://technet.microsoft.com/en-us/library/cc262735.aspx#section1, Published on May 12, 2010, pp. 1-6.

"Filenet Content Manager.", http://www-01.ibm.com/software/data/content-management/filenet-content-manager/features.html , Downloaded circa Nov. 30, 2011, pp. 1-3.

\* cited by examiner

FIG. 4A

Historical Data for User_1

| Search | Retention Category | Search Name | Date & Time |
|---|---|---|---|
| "Documents Created By user "abc"" | RC1 | SearchName_1 | 01-12-2011 01:30 |
| "Documents Created By user "xyz"" | RC1 | SearchName_2 | 01-12-2011 01:32 |
| "Documents Created By user "xyz"" | RC2 | SearchName_3 | 01-12-2011 01:35 |
| "Documents name starting with "doc%"" | RC3 | SearchName_4 | 06-12-2011 05:40 |

- 422 Search
- 423 Retention Category
- 425 Search Name
- 426 Date & Time
- 441, 442, 443, 444 (rows)
- 400 (table)

FIG. 4B

Historical Data for User_2

| Search | Retention Category | Search Name | Date & Time |
|---|---|---|---|
| "Documents Created By user "txt"" | RC2 | SearchName_6 | 02-12-2011 10:30 |
| "Documents name starting with "txt%"" | RC3 | SearchName_7 | 05-12-2011 05:45 |
| "Documents name starting with "try"" | RC2 | SearchName_8 | 06-12-2011 05:30 |

- 451 Search
- 452 Retention Category
- 453 Search Name
- 454 Date & Time
- 465, 466, 467 (rows)
- 450 (table)

MODEL FOR GENERATING CUSTOM FILE PLANS TOWARDS MANAGEMENT OF CONTENT AS RECORDS

RELATED APPLICATIONS

The present application is a continuation of and claims priority from co-pending US Non-provisional patent application entitled, "MODEL FOR GENERATING CUSTOM FILE PLANS TOWARDS MANAGEMENT OF CONTENT AS RECORDS", application Ser. No. 13/492,932 filed on 11 Jun. 2012, and is incorporated in its entirety herewith.

BACKGROUND OF THE INVENTION

1. Technical Field

The present disclosure relates to content management, and more specifically to generating custom file plans towards management of content as records.

2. Related Art

Records generally refer to content that is required to be preserved with some level of permanency, due to various legal or business reasons. Typically, information is stored as content, and upon triggering of a pre-specified event, the content is treated as a record. For example, in the case of income tax returns, when a document is submitted as an official return, the corresponding content is thereafter retained as a record. Treatment as a record thereafter typically implies restriction (e.g., prohibiting) on modification of the content, association of retention (how long to retain) and disposition policies (how/when to destroy or archive), specifying access control policies, etc., as is well known in the relevant arts.

Records Management systems (RMS) are often employed to maintain records. In general, an RMS may enable specifying of the various types/categories of entities (content) for which records are to be maintained, the extent of information to be maintained as records, the policies to be applied for aspects such as disposition, retention, etc. An RMS may also be designed to interface with systems such as content management systems (CMS) to enforce various rules/policies specified associated with the content (or entities) stored in the CMS.

Policies are often provided in an RMS to simplify (for the users) specifying the manner in which records of interest are to be treated. Typically, a knowledgeable person such as an administrator will define multiple policies, with each policy specifying a corresponding set of disposition information, etc. The set of policies in the RMS is displayed as a file plan to the user, such that the user may conveniently select/specify desired policy for association with entities of interest. The policy thus specified is thereafter applicable to the entities of interest.

There is a general need to provide custom file plans to users of RMS, such that association of desired policies with corresponding entities of interest is simplified.

BRIEF DESCRIPTION OF THE DRAWINGS

Example embodiments of the present invention will be described with reference to the accompanying drawings briefly described below.

FIGS. 4A and 4B contain respective tables depicting the maintained historical data for corresponding users in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention provides a convenient approach for managing records with respect to entities based on file plans. In an embodiment, historical data representing policies previously selected is maintained. The historical data is then used to generate custom file plans containing policies most likely to be used by a corresponding user. A list in such custom file plan may have more relevant policies prioritized higher. A user may thus conveniently select a desired policy, and associate the selected policy with a set of entities to cause the selected policies to be applied against management of the set of entities.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
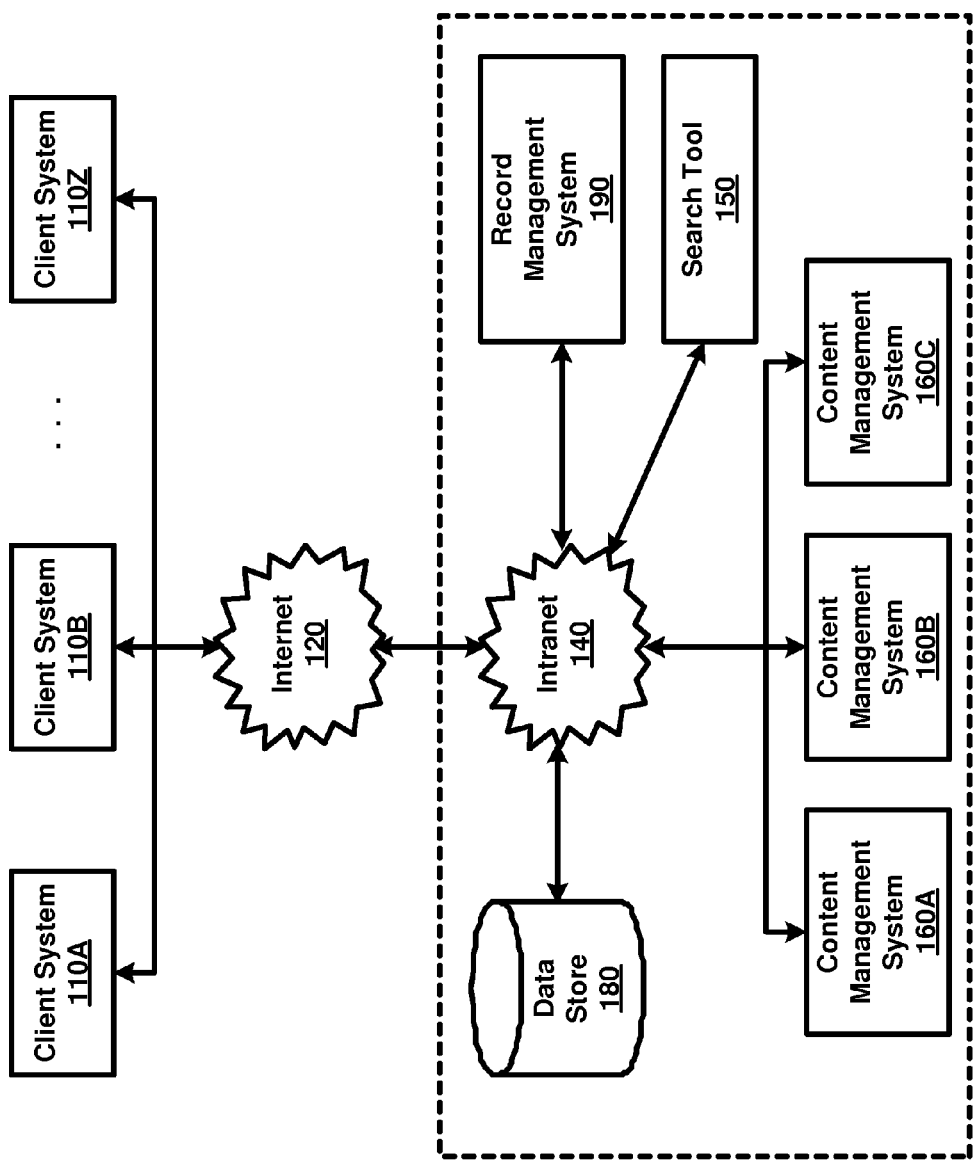
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110Z, Internet 120, intranet 140, search tool 150, content management systems (CMS) 160A-160C, data store 180, and records management system (RMS) 190. Merely for illustration, only representative number/type of systems is shown in FIG. 1. Many environments often contain many more systems, both in number and type, depending on the purpose for which the environment is designed. Each system/device of FIG. 1 is described below in further detail.

Intranet 140 represents a network providing connectivity between data store 180, search tool 150, content management systems 160A-160C and records management system 190, all provided within an enterprise (as indicated by the dotted boundary). Internet 120 extends the connectivity of these systems (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies the target application, the packet may be said to be directed to such application as well.

Each of client systems 110A-110Z represents a system such as a personal computer, workstation, mobile station, etc., used by users to generate (client) requests directed to enterprise content management systems 160A-160C, records management system 190 and search tool 150. The requests may be generated using appropriate user interfaces. In general, a client system requests an application (executing on corresponding server system 160A-160C, 150 or 190) for performing desired tasks and receives corresponding responses containing the results of performance of the requested tasks. Each request is sent in the form of an IP packet directed to the desired server system, with the IP packet including data identifying the desired tasks in the payload portion.

Each of content management systems (CMS) 160A-160C represents example entity systems, which provide the corresponding entities. It is assumed that each CMS stores various digital content constituting corresponding entities, which can be created, modified and accessed by various users at client systems 110A-110Z. Each content can be any type of digital information (for example files, documents, medical x-rays, application data, e-mail, text, images, graphics, video, sound, etc.). Though CMS 160A-160C are shown within the enterprise, it should be appreciated that some of the CMS (not shown) may be provided external (coupled via Internet 120) to the enterprise as well.

Search Tool 150 enables users at client systems 110A-110Z to search the entities in CMS 160A-160C and the records/policies in RMS 190 by corresponding appropriate user interfaces, to the extent the corresponding user is authorized to access the requested information. Though shown as a separate block, search tool 150 may be provided within one of RMS 190 and client systems 110A-110Z. As described in sections below, search tool 150 may also facilitate a user to specify the policies applicable to specific entities of interest.

Data store 180 represents a non-volatile (persistent) storage facilitating storage and retrieval of data by applications executing in records management system 190 and/or search tool 150. Data store 180 may be implemented as a corresponding database server using relational database technologies and accordingly provide storage and retrieval of data using structured queries such as SQL (Structured Query Language). Alternatively, data store 140 may be implemented as a corresponding file server providing storage and retrieval of data in the form of files organized as one or more directories, as is well known in the relevant arts.

Records management system 190 (RMS) is operable to maintain entities stored in various CMS 160A-160C, as records. RMS 190 may form and store meta-data related to management of entities as records. The data may be stored internal to RMS 190 or potentially in data storage 180 and/or CMS 160A-160C, as suited in the corresponding environment. Though shown as being in a single enterprise, the RMS and CMS may be located in different enterprises. As noted above, the specific types/extent of records maintained for different entities can be different, depending on the corresponding requirements specified by the users/administrators. RMS 190 may provide file plans for simplifying the task of specifying the various policies that are to be applied in management of entities as records.

Various aspects of the present invention provide a convenient approach by which policies can be associated with desired entities, as described below with examples.

3. Convenient Selection of Policies

Figure 2:
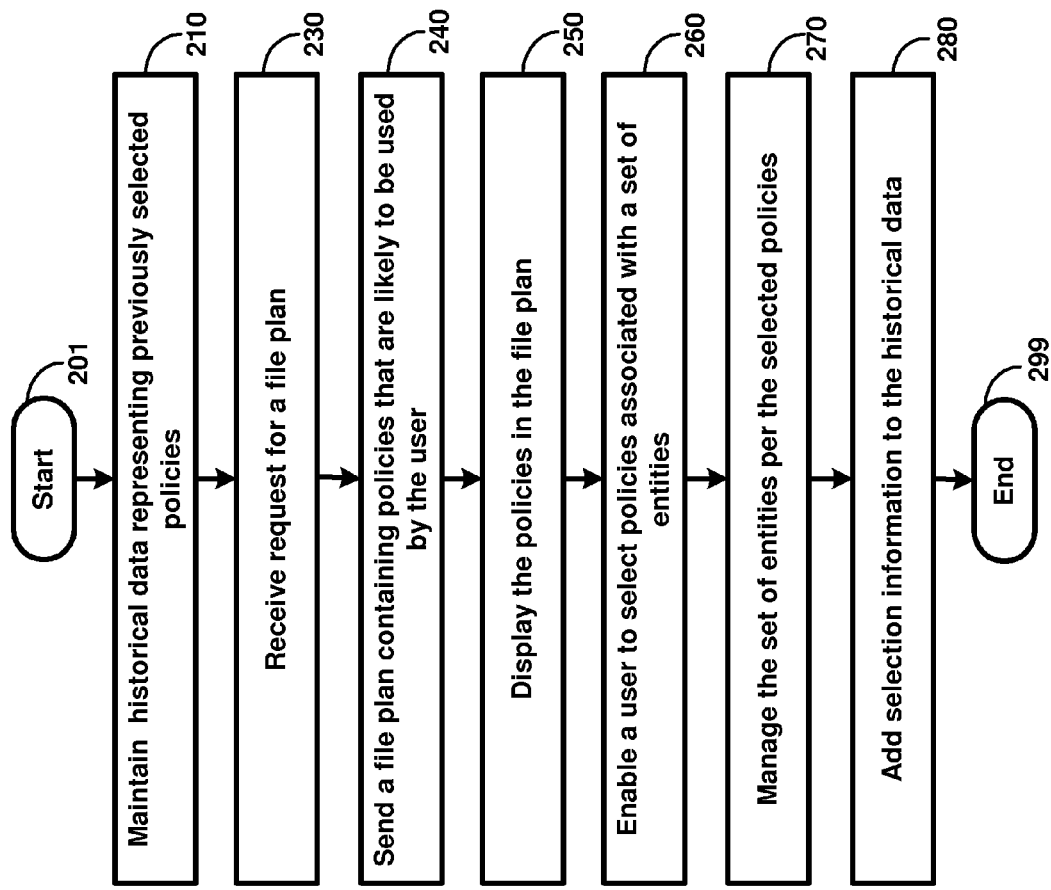
FIG. 2 is a flowchart illustrating the manner in which a user can conveniently select a file plan for entities of interest in a record management system.

FIG. 2 is a flowchart illustrating the manner in which a user can conveniently select a policy for entities of interest in a record management system according to an aspect of the present invention. The flowchart is described with respect to the blocks of FIG. 1, in particular search tool 150, merely for illustration. However, many of the features can be implemented in other environments and other blocks also without departing from the scope and spirit of several aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, historical data representing previously selected policies is maintained, for example, by search tool 150. The historical data stored can contain the details of individual selections or can be some summarized/aggregated form for several selections. The details similarly can include any attributes, as suited in the corresponding environment, for ensuring that the future policy selections are made convenient according to several aspects of the present invention. The historical data can be stored, for example, in data store 180 operating as a relational database system.

In step 230, search tool 150 receives a request for a file plan, for example, from a user of one of the client systems (110A-110Z). The request may be received in the form of an IP packet directed to a system in which search tool 150 is implemented. In general, a file plan contains information representing various choices (e.g., applicable policies, location of directories, etc.) a user can make in management of content as a record, though the features of the subject disclosure are focused on policies.

In step 240, search tool 150 forms a file plan containing policies that are likely to be used by the user, based on the maintained historical data, and sends the formed file plan to the user. Such forming entails identification of more relevant policies for the user, compared to the ones that are less likely to be relevant (and thus of lesser interest or lower probability of usage). Any approach can be used for such identification based on historical data. Various such approaches will be apparent to a skilled practitioner, based on the disclosure provided herein.

In step 250, search tool 150 displays (send for display) the policies in the file plan at one of client systems (110A-110Z) from which the request of step 230 is received. In step 260, search tool 150 enables a user to select one of the policies, for association with a set of entities. Various approaches can be used for such selection and association.

In one embodiment, search tool 150 further prioritizes the policies included in the file plan, with the policies more likely to be used, being prioritized higher (compared to ones that are less likely to be used) in step 240. The display of step 250 may also be performed to depict the priorities of the policies, such that the ones more relevant (likely to be used) are positioned for easier selection. Such display generally entails positioning the respective policies in a location, form or style such that the more relevant (higher priority) policies are more prominently accessible for selection (compared to the lesser priority policies) on the display screen. According to one convention described below, the highest priority policy is simply displayed at a top of a hierarchy display. Due to the prioritized display, the specific policy of interest is potentially easier to select, thereby simplifying the user's task in management of records.

In step 270, the set of entities are managed per the selected policies. Thus, the various policies selected based on the file plan are thereafter enforced in the usage (including retention disposition) of the set of entities. Search tool 150, RMS 190 and CMS 160A-160C may operate collaboratively in ensuring the policies are enforced. Thus, RMS 190 may store the selection/association information as corresponding metadata (internally in RMS 190 or in data store 180) and CMS 160A-160C may thereafter ensure that the policies specified in the associated records are enforced in conjunction with RMS 190. Additional records (e.g., information on transactions that trigger enforcement and corresponding actions taken) may be created and stored associated with such enforcement.

In step 280, search tool 150 adds the selection information to the historical data. Such addition can be designed to make the formation (of file plans) of step 240 more effective (and thus selection of step 260 more convenient). The addition of information may thus be viewed as being part of the maintenance of step 210 as well. The flow chart ends in step 299 and may be repeated for each request for file plans received in step 230.

Thus, a user may be able to conveniently select policies associated with various entities of interest. The features described may be implemented in conjunction with various user interfaces and various types of policies. The description is accordingly continued with respect to various examples.

4. Policies and Historical Data

Figure 3:
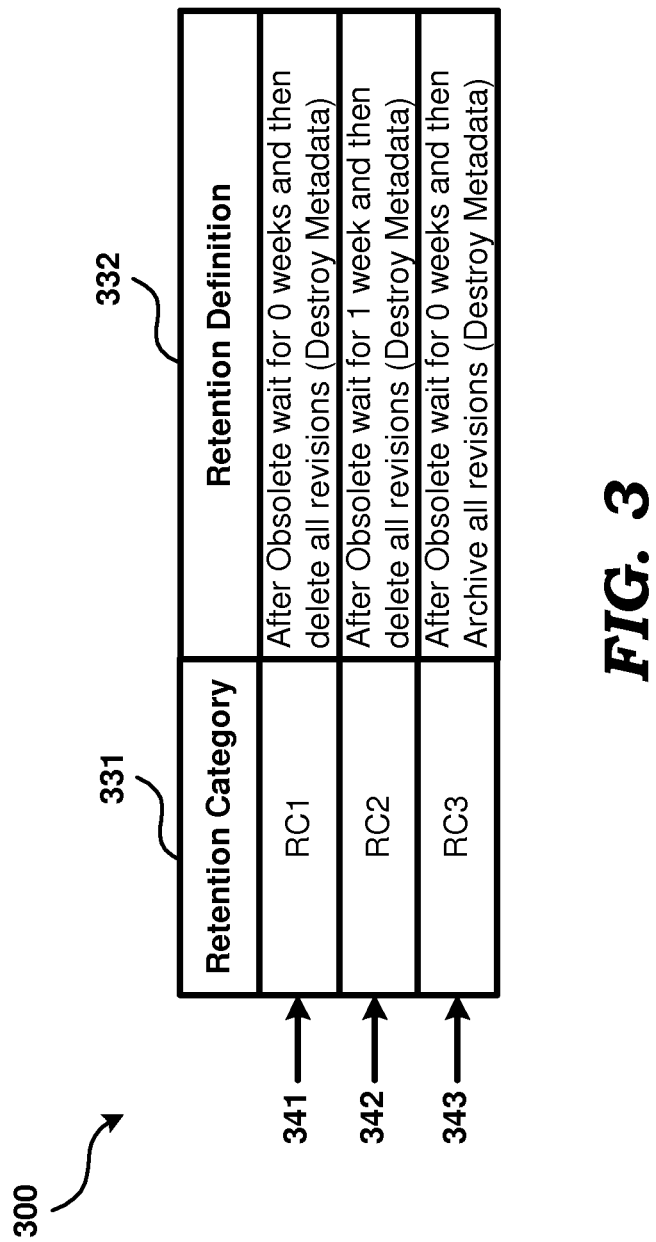
FIG. 3 is a table containing policies defined in a record management system in one embodiment.

FIG. 3 is a table containing the policies/rules defined and stored in record management system (190) in one embodiment. Typically, administrator type people in authority define such policies, which are then used by various users, according to their level of authorization.

Only a few example definitions related to retention/disposition categories are shown for illustration, though the definitions can contain policies related to various other aspects/functions such as archive, move, transfer, accession, delete etc. As is well known, retention policies indicate how long a particular digital content item must be maintained as a record before being marked ready for disposition. Disposition policies indicate what must be done with the corresponding entities (digital content) after being marked ready for disposition.

Table 300 is shown containing retention category (column 331) and retention definition corresponding to the retention category (column 332). Rows 341-343 contain information corresponding to respective policies. Thus, row 341 have a category identifier of RC1 and the specified policy is stated as "After obsolete wait for 0 weeks and then delete all revisions (Destroy Metadata)".

FIGS. 4A and 4B contain tables, which respectively depict the maintained historical data for corresponding users (user_1 and user_2) in one embodiment. Table 400 is shown containing, search column 422, retention category column 423 (with identifiers matching entries of column 331 of FIG. 3), search name column 425 and date/time column 426. Each of rows 441-444 depicts the historical data stored corresponding to the addition of step 280 of FIG. 2 for user_1. Thus, rows 441-444 may represent all historical searches performed by user_1.

Thus, row 441 indicates that a user has performed a search (identified by an identifier "SearchName_1) with a criteria string "Documents Created By user "abc"" (described below with respect to FIG. 5), the selected retention category is RC1, at around Jan. 12, 2011 1:30. Columns 451-454 and rows 465-467 of table 450 store data corresponding to user_2, and are described similarly. It should be appreciated that typical systems contain many more users and corresponding number tables may be maintained. Alternatively, all the tables may be merged into a single table.

An example user interface corresponding to and using the historical data of FIG. 4A is described below.

5. Example User Interface

Figure 5:
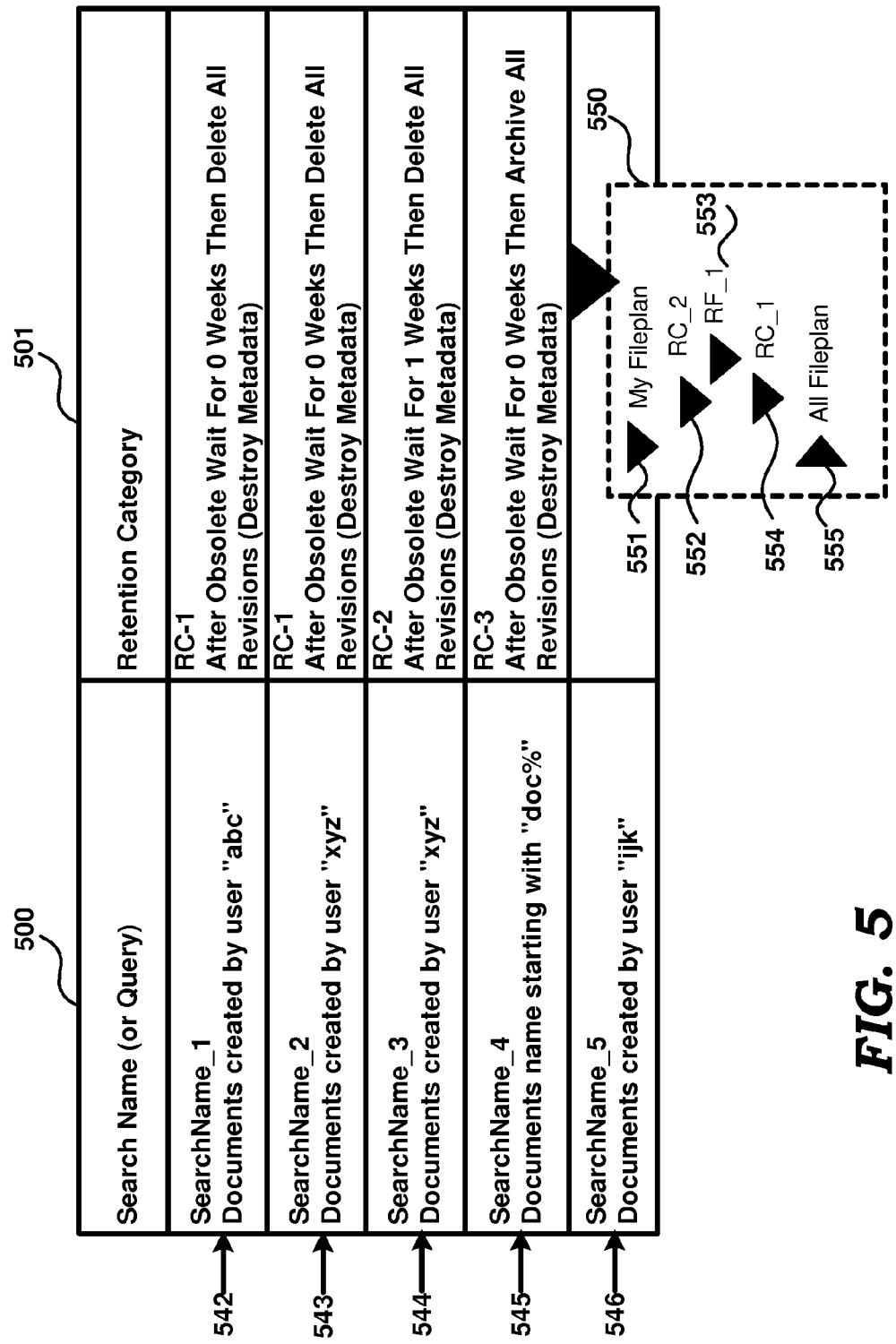
FIG. 5 depicts an example user interface using which a user conveniently selects one of the policies associated with a set of entities, in an embodiment.

FIG. 5 depicts an example user interface using which a user (user_1) conveniently selects one of the policies for associating with a set of entities, in an embodiment. The display may be on a display screen provided on one of client systems 110A-110Z, as a user there interacts with RMS 190 (and potentially CMS) via search tool 150. The display there is shown containing two columns—search name (or Query) 500 and retention category 501. Rows 542-546 depict the interaction for respective transaction by a specific user. Rows 542-545 correspond to transactions previously completed and thus the corresponding historical data is shown stored in respective rows 441-444 of FIG. 4A.

Thus, row 542 depicts that a user had issued a query with criteria "Documents created by user "abc"" (issued to any (or all) of CMS 160A-160C), and has assigned a name/identifier of SearchName_1 for that search (or the name/identifier may be automatically assigned by the search tool 150). The row further depicts that the user has associated a retention category (policy) of RC-1 (of row 341 of FIG. 3) to the entities matching the search query. In other words, for all digital content created by "abc" found in any of the CMS, a retention category of RC1 is shown to be assigned. A corresponding entry is made in the historical data of row 441 of FIG. 4A.

The interaction of row 546 is shown after completion of interaction corresponding to rows 542-545. The user is shown having entered a query "Documents created by user "ijk" with identifier SearchName_5. The user is then deemed to have performed an appropriate action (e.g., right click in the entry corresponding to 501/546), which causes a request for custom file plan (230) to be generated to search tool 150.

In response, search tool 150 may retrieve policies contained in the historical data maintained in FIG. 4A, and form the file plan with the policies that are likely to be used by the user. Further search tool 150 may prioritize the retrieved policies based on various criteria including prior searches performed by a user, prior retention categories selected (by a user), date and Time at which the searches were performed, searches that are relevant (closely resemble) to the current search and any other relevant information as required according to the corresponding environment. Sufficient amount of historical data/information needs to be accordingly maintained.

In one embodiment, the entries (of the table of the current user) having search strings of historical searches that match closer to the search string of the current search, are given higher priority. In case multiple entries/strings are considered of equal match, the ones used more frequently (i.e., same search repeated, gets higher priority) or recently (based on the time stamp in column 426) are given higher priority.

Applying such an approach to the search string of row 546, the four rows 441-444 are first identified. When the current string (of row 546) is compared with the historical strings (of rows 441-444), the strings of rows 441-443 are considered closer (equally close) than that in row 444. Among rows 441-443, row 443 is considered the most recent search and row 442 the next most recent, based on the time stamp in column 426. Accordingly, the retention categories (policies) RC2 and RC1 are considered higher priority in that order.

Thus, a file plan containing the (prioritized list of) retention categories (of column 423) is formed and sent to client system 110A. It should be appreciated that a user may be sent multiple file plans, though the embodiments are shown sending/displaying a single file plan only.

Results of such a prioritized list are displayed in display area 550 of FIG. 5 (250) in one embodiment. Display area 550 shows top level sections 551 (My Fileplan) and 555 (All Fileplan). Section 551 is shown containing two sub-sections 552 (RC_2) and 554 (RC_1), and sub-section 552 is shown with a lower entry 553 (RF_1). It may be appreciated that RF refers to a Retention Folder, which may be viewed as a sub-section inside RC and will have the same applicable disposition rules as that of RC. By having a folder, an action can be specified with respect to the folder, to cause the same action to be performed on all the items in the folder.

My Fileplan 551 represents the prioritized policies for a specific user (User_1), with sub-sections RC_2 and RC_1 representing the retention categories prioritized for the user using the historical data (shown in FIG. 4A). On the other hand, 'All Fileplan' is a tab/option for viewing all the retention categories available in RMS 190 and is described below in detail. It may be noted that the retention category RC_2 (552) is prioritized to be displayed as the first option below the section 551 (in the display area 550) based on the analysis of historical data (FIG. 4A), as described above.

Assuming the user is interested in policies not included in the prioritized list (displayed with 551) the user may select/operate 'All Fileplan' 555, which causes the display of all policies the current user is authorized to use. Accordingly, all retention categories in column 331 from RMS 190 are fetched and displayed for selection by a user.

Thus, the user can select the specific policy (among the ones displayed) to apply against the entities matching the search string in 546 and the corresponding policies are thereafter applied against all the matching entities. To facilitate such enforcement, any corresponding required information is sent to RMS 190 and/or CMS 160A-160C. The historical data of FIG. 4A is updated to add a new row, reflecting the selection.

It may be appreciated that there are often a large number policies (of the order of several hundreds) in RMS 190, and thus features of the present invention simplify selection of suitable policies by providing prioritized list, as described above.

It should be further appreciated that the features described above can be implemented in various embodiments as a desired combination of one or more of hardware, executable modules, and firmware. The description is continued with respect to an embodiment in which various features are operative when the executable modules described above are executed.

6. Digital Processing System

Figure 6:
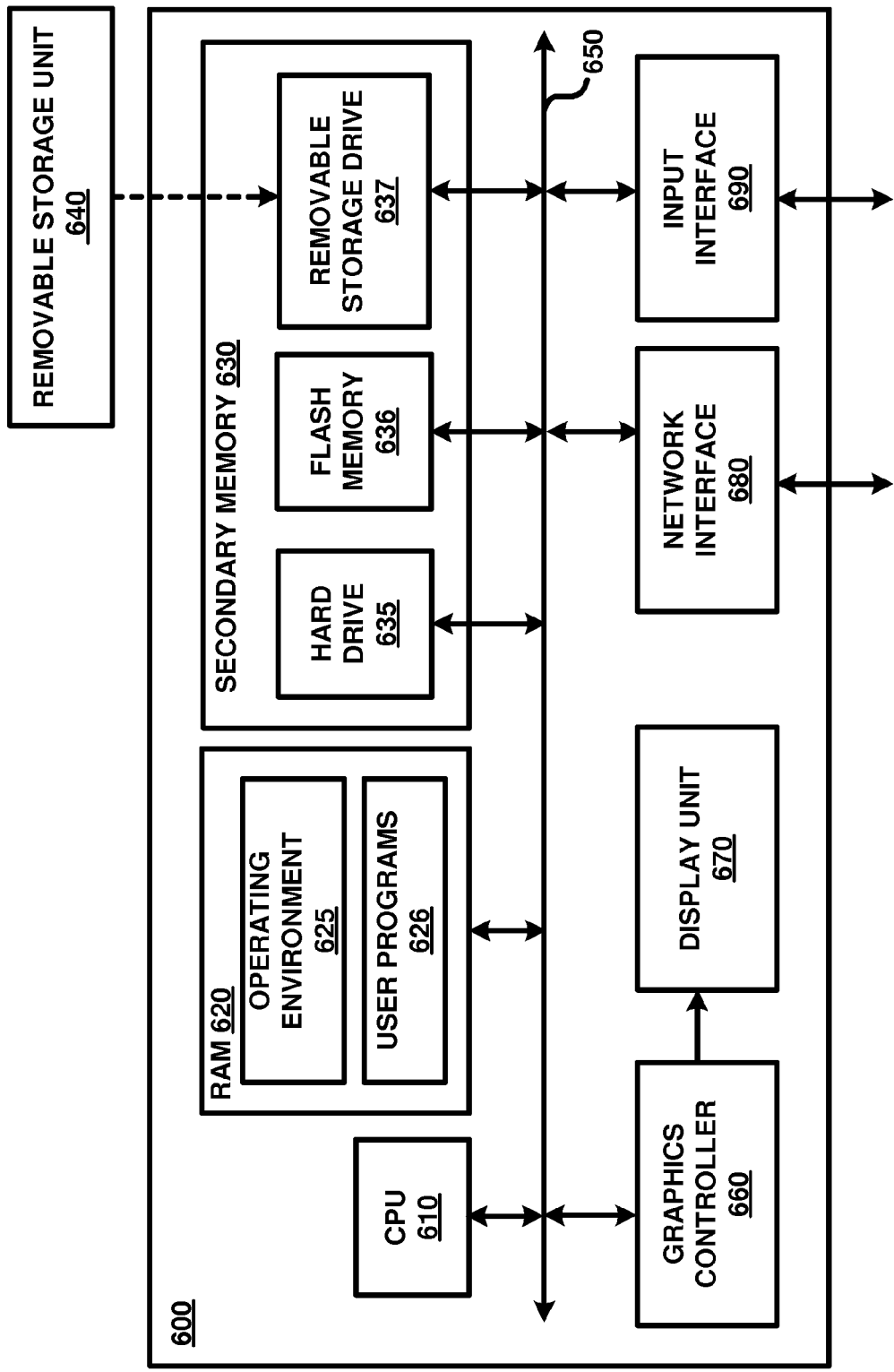
FIG. 6 is a block diagram illustrating the details of digital processing system in which several aspects of the present invention are operative.

FIG. 6 is a block diagram illustrating the details of digital processing system 600 in which several aspects of the present invention are operative by execution of appropriate executable modules. Digital processing system 600 may correspond to any system such as Search Tool 150, content management system 160A-160C, Record Management System 190 and client system 110A-110Z, from which the features described above are operative.

Digital processing system 600 may contain one or more processors (such as a central processing unit (CPU) 610), random access memory (RAM) 620, secondary memory 630, graphics controller 660, display unit 670, network interface 680, and input/output interface 690. All the components except display unit 670 may communicate with each other over communication path 650, which may contain several buses as is well known in the relevant arts.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. Execution of such instructions may provide corresponding applications in CMS's 160A-160C, RMS 190 and search tool 150.

RAM 620 may receive instructions from secondary memory 630 using communication path 650. RAM 620 is shown currently containing software instructions constituting shared environment 625 and/or user programs 626. Shared environment 625 contains utilities shared by user programs, and such shared utilities include operating system 180, virtual machines, etc., which provide a (common) run-time environment for execution of user programs/applications 626. User programs 626 can include one of more of search tool 150 and applications in content management systems 160A-160C and record management system 190, depending on the specific system of FIG. 1 represented by system 600.

Graphics controller 660 generates display signals (e.g., in RGB format) to display unit 670 based on data/instructions received from CPU 610. Display unit 670 contains a display screen to display the images defined by the display signals. Input/output interface 690 includes input as well as output devices to enable a user to interact with system 600. Network interface 680 provides the physical, electrical and protocol implementations that enable system 600 to communicate with other systems using protocols such as TCP/IP.

Secondary memory 630 (representing a non-transitory storage/medium) may contain hard drive 635, flash memory 636, and removable storage drive 637. Secondary memory 630 may store data and software instructions (for example, for performing the steps of FIG. 2), which enable digital processing system 600 to provide several features in accordance with the present invention, as described above.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 630. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of managing records with respect to entities, said method comprising:

maintaining historical data representing previously selected policies, wherein said historical data comprises a plurality of entries, wherein each entry stores a search string associated with a selected policy to indicate that the selected policy is applied to entities matching the search string;

receiving a request for file plan from a user, wherein said user specifies a first search string as a part of said request;

determining a set of policies based on similarity of said first search string to search strings in said plurality of entries;

forming a file plan containing said set of policies likely to be used by said user, said set of policies being determined based on said historical data, said first search string qualifying the entities to be included in said first set of entities;

sending said file plan to said user;

receiving from said user, a selection of a first policy of said set of policies for associating with a first set of entities;

applying said first policy to said first set of entities such that said first policy is thereafter enforced with respect to said first set of entities; and adding an additional entry to said historical data upon receiving of said selection, wherein said additional entry stores said first search string associated with said first policy in response to receiving of said selection.

2. The method of claim 1, wherein said forming comprises generating said set of policies in the form of a prioritized list, wherein a policy more likely to be used by said user is indicated to be of higher priority compared to another policy less likely to be used by said user.

3. The method of claim 2, wherein the entries corresponding to each user are stored in a corresponding table, wherein said generating of said prioritized list further comprises:

identifying a table corresponding to said user from whom said request is received, said table containing a set of entries of said plurality of entries; and prioritizing higher the entries having corresponding strings which are more similar than other strings, with respect to said search string, wherein the policies of the prioritized entries are included in said file plan.

4. The method of claim 3, wherein each entry further stores a time stamp at which the policy was selected, wherein said prioritizing further comprises prioritizing the entries with more recent time stamp if two entries are deemed to have same level of similarity with respect to search strings.

5. The method of claim 2, wherein each policy specifies a corresponding retention category which in turn specifies retention and disposition policies.

6. A non-transitory machine readable medium storing one or more sequences of instructions of managing records with respect to entities, wherein execution of said one or more sequences of instructions by one or more processors contained in said system causes said system to perform the actions of maintaining historical data representing previously selected policies, wherein said historical data comprises a plurality of entries, wherein each entry stores a search string associated with a selected policy to indicate that the selected policy is applied to entities matching the search string;

receiving a request for a file plan from a user, wherein said user specifies a first search string as a part of said request;

determining a set of policies based on similarity of said first search string to search strings in said plurality of entries;

forming a file plan containing said set of policies likely to be used by said user, said set of policies being determined based on said historical data, said first search string qualifying the entities to be included in said first set of entities;

sending said file plan to said user;

receiving from said user, a selection of a first policy of said set of policies for associating with a first set of entities;

applying said first policy to said first set of entities such that said first policy is thereafter enforced with respect to said first set of entities; and adding an additional entry to said historical data upon receiving of said selection, wherein said additional entry stores said first search string associated with said first policy in response to receiving of said selection.

7. The machine readable medium of claim 6, wherein said forming comprises generating said set of policies in the form of a prioritized list, wherein a policy more likely to be used by said user is indicated to be of higher priority compared to another policy less likely to be used by said user.

8. The machine readable medium of claim 7, wherein the entries corresponding to each user are stored in a corresponding table, wherein said generating of said prioritized list further comprises:
identifying a table corresponding to the same user from whom said request is received, said table containing a set of entries of said plurality of entries; and
prioritizing higher the entries having corresponding strings which are more similar than other strings, with respect to said search string,
wherein the policies of the prioritized entries are included in said file plan.

9. The machine readable medium of claim 8, wherein each entry further storing a time stamp at which the policy was selected, wherein said prioritizing further comprises prioritizing the entries with more recent time stamp if two entries are deemed to have same level of similarity with respect to search strings wherein each file plan specifies a corresponding retention category which in turn specifies retention and disposition policies.

10. A system managing records with respect to entities, said system comprising:
a memory to store a set of instructions;
a processor to retrieve and execute said instructions, wherein execution of said set of instructions causes said system to perform the actions of:
maintaining historical data representing previously selected policies, wherein said historical data comprises a plurality of entries, wherein each entry stores a search string associated with a selected policy to indicate that the selected policy is applied to entities matching the search string;
receiving a request for a file plan from a user, wherein said user specifies a first search string as a part of said request;
forming a file plan containing said set of policies likely to be used by said user, said set of policies being determined based on said historical data, said first search string qualifying the entities to be included in said first set of entities;
sending said file plan to said user;
receiving from said user, a selection of a first policy of said set of policies for associating with a first set of entities;
applying said first policy to said first set of entities such that said first policy is thereafter enforced with respect to said first set of entities; and
adding an additional entry to said historical data upon receiving of said selection, wherein said additional entry stores said first search string associated with said first policy in response to receiving of said selection.

11. The system of claim 10, wherein said forming comprises generating said set of policies in the form of a prioritized list, wherein a policy more likely to be used by said user is indicated to be of higher priority compared to another policy less likely to be used by said user.

12. The system of claim 11, wherein the entries corresponding to each user are stored in a corresponding table, wherein said generating of said prioritized list further comprises:
identifying a table corresponding to the same user from whom said request is received, said table containing a set of entries of said plurality of entries; and
prioritizing higher the entries having corresponding strings which are more similar than other strings, with respect to said search string,
wherein the policies of the prioritized entries are included in said file plan.

13. The system of claim 12, wherein each entry further storing a time stamp at which the policy was selected, wherein said prioritizing further comprises prioritizing the entries with more recent time stamp if two entries are deemed to have same level of similarity with respect to search strings, wherein each policy specifies a corresponding retention category which in turn specifies retention and disposition policies.

14. The system of claim 10, wherein said system is a record management system.

* * * * *